Figure 3:
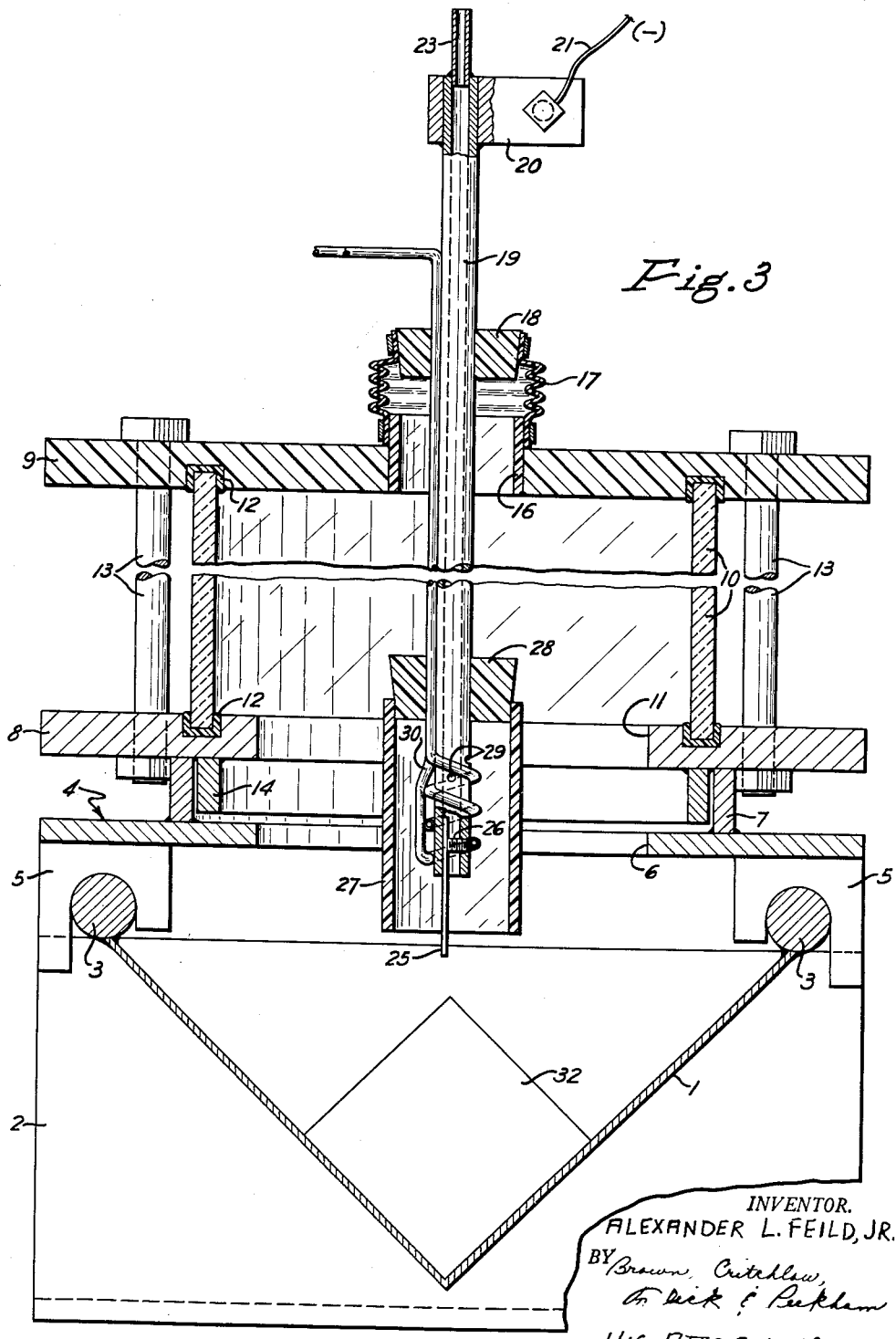

May 2, 1961  A. L. FEILD, JR  2,982,843
ELECTRIC WELDING APPARATUS
Filed July 2, 1959  2 Sheets-Sheet 1
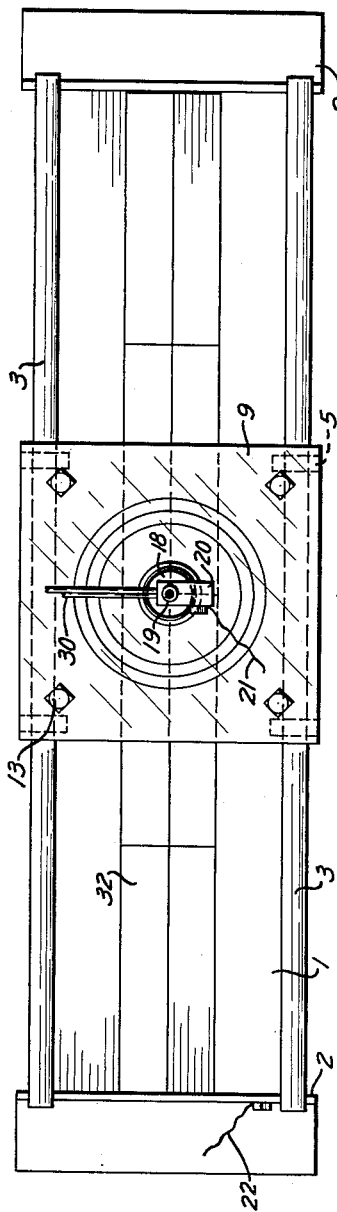
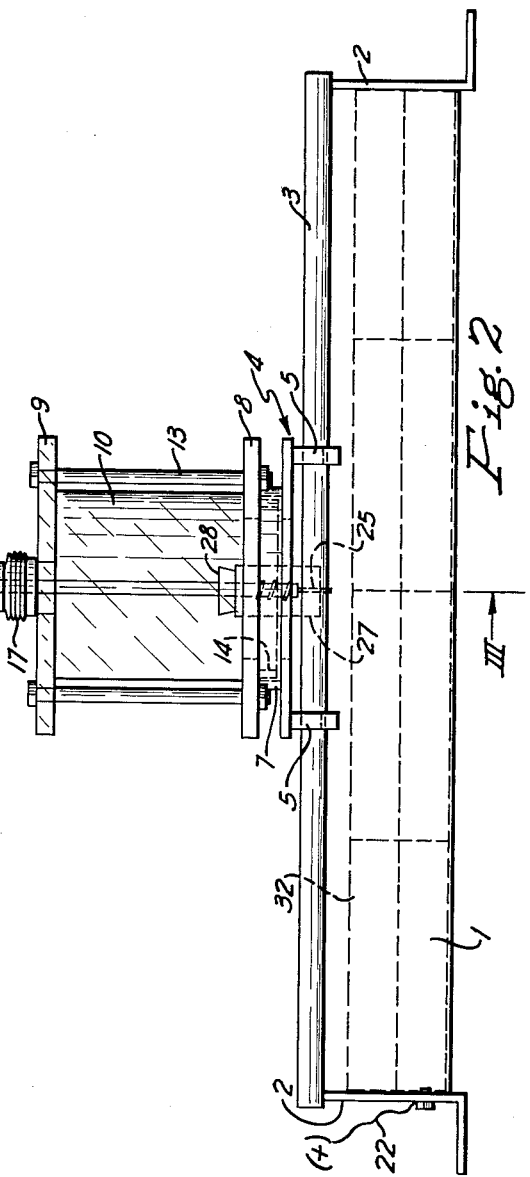
INVENTOR.
ALEXANDER L. FEILD, JR.
BY Brown, Critchlow,
Flick & Peckham
HIS ATTORNEYS May 2, 1961  A. L. FEILD, JR  2,982,843
ELECTRIC WELDING APPARATUS
Filed July 2, 1959  2 Sheets-Sheet 2

INVENTOR.
ALEXANDER L. FEILD, JR.
BY Brown, Critchlow,
Flick & Peckham
HIS ATTORNEYS

United States Patent Office 2,982,843
Patented May 2, 1961

---

2,982,843

ELECTRIC WELDING APPARATUS

Alexander L. Feild, Jr., Bridgeville, Pa., assignor to Universal-Cyclops Steel Corporation, Bridgeville, Pa., a corporation of Pennsylvania Filed July 2, 1959, Ser. No. 824,625

1 Claim. (Cl. 219—74)

This invention relates to electric welding apparatus, more particularly for welding in an inert atmosphere.

In the welding of such reactive and refractory metals as titanium, columbium, molybdenum, tantalum and many alloys of these metals, it is necessary to produce contamination-free welds. That is done by welding in an inert atmosphere. However, the present methods are expensive, time consuming and rather inflexible.

It is among the objects of this invention to provide electric welding apparatus, with which contamination-free welds can be made quickly and inexpensively in a reliable manner and on workpieces of various sizes and shapes. Another object is to provide such apparatus that holds the individual workpieces in alignment while they are being welded end to end.

The preferred embodiment of the invention is illustrated in the accompanying drawings, in which Fig. 1 is a plan view;
Fig. 2 is a side view; and
Fig. 3 is an enlarged cross section taken on the line III—III of Fig. 2.

Referring to the drawings, a support for the work to be welded is provided. When metal pieces are to be welded end to end, such as to form a consumable electrode, a trough is used that includes a V-shaped channel 1 supported at its ends by end plates 2. Circular rods 3 may be welded along the upper edges of the channel to form rails, along which the welding unit can be moved in order to perform welding operations at different points lengthwise of the trough. The welding unit includes a supporting pedestal 4, at the corners of which there are notched feet 5 extending downward and fitting over the rails of the trough. As shown in Fig. 3, the central portion of the pedestal has a large opening 6, around the top of which a short ring 7 is secured. This ring supports the lower of two vertically spaced plates 8 and 9 that are held apart by a large cylinder 10 encircling a large opening 11 in the lower plate coaxial with opening 6 in the pedestal. The upper and lower ends of the cylinder fit into annular gaskets 12 seated in channels in the top and bottom plates. The cylinder is clamped in place by tie bolts 13 extending through the two plates. The cylinder is held in proper relation to the pedestal opening by means of a short ring 14 secured to the bottom of the bottom plate and fitting within pedestal ring 7. It will be seen that the unit formed by the two plates and the cylinder clamped between them can be quickly removed from the pedestal and replaced whenever desired.

The center of top plate 9 is provided with a relatively small opening, in which a sleeve 16 is rigidly mounted. The sleeve projects above the plate and is encircled tightly by the lower end of a short piece of flexible hose 17, the upper end of which is clamped around a resilient stopper 18. Extending down through a central opening in this stopper and through cylinder 10 is a copper tube 19 that is gripped tightly by the stopper and supported by it. The stopper and hose form a seal between the top plate and the tube. The upper end of the tube supports a connector 20 for a wire 21 in an electric welding circuit. The other side of the circuit is connected to the trough through a wire 22. Projecting from the upper end of the tube is a short nipple 23, by which the tube can be connected through a flexible hose (not shown) to a source of inert gas, such as argon or helium. The copper tube extends down out of the cylinder and also through the opening in the pedestal.

Projecting downward from the lower end of tube 19 is an electrode tip 25, such as tungsten, that is clamped against one side of the interior of the tube by means of a set screw 26. The tip does not plug the lower end of the tube, but leaves the passage through it open. The lower end portion of the tube is encircled by a silica shield 27 that is spaced a considerable distance from the tube. This spacing and support of the shield from the tube is accomplished by means of a stopper 28 plugged into the upper end of the shield and containing a cylindrical hole through which the tube extends. The stopper grips the tube tightly, but can be moved up and down on the tube if desired. The side wall of the tube inside the shield is provided with a plurality of radial holes 29 and is cooled by water flowing through a very small pipe 30 coiled around the tube and extending up through both stoppers to water-circulating means (not shown).

In using this apparatus to weld together slugs or short bars 32 of metal in order to form, for example, a consumable electrode, the workpieces are laid in the trough end to end in engagement with one another and may be clamped therein by any suitable means. The welding unit then is set on the trough rails and moved along the trough to a point above the seam that is to be welded first, and metal tube 19 is pushed down through its supporting stopper 18 to bring the lower end of the electrode tip 25 fairly close to the work. Then the flexibility of hose 17 will allow the electrode to be pressed down as close to the work as desired. The cooling water, electric current and inert gas then are turned on and an arc is struck between the tip and the work.

The welding pool size and depth may be controlled by power input and skillful manipulation of the electrode, which is permitted by the flexible support for the electrode tube 19. Thus, the flexible seal 17 permits the operator, who holds onto the upper part of the tube, to swing the electrode tip around to any desired point and it also permits him to raise and lower the tip. In order that the operator may see what he is doing, the cylinder and top plate 9 should be transparent. They can be made of Pyrex glass or Lucite. By looking down through the plate or through the side of the cylinder, the operator can watch the welding through the two large openings in the lower plate and pedestal. Visibility is further improved by making the silica shield 27 transparent also.

Due to the flow of inert gas out of the lower end of the electrode tube and its radial holes 29, the shield is filled with gas which flows down around the electrode tip and the weld and blankets the pool of molten metal to protect it from air contamination. After the current has been shut off, the gas flow is maintained over the pool for about a minute to prevent contamination during cooling. The unit then is moved down the track to the next welding position and the operation is repeated. After the work has been welded at one corner, it is rotated and the process is repeated at the other corners as desired.

It will be seen that this apparatus can be operated in air, and yet the weld will be protected by an inert gas. The flexible support for the electrode tube and the manual manipulation of that tube provide unlimited flexibility in making welded joints in various shapes and sizes of bars at a great saving in time. Furthermore, straight electrodes of circular or polygonal section are made with simple fixtures.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

Electric welding apparatus comprising a pair of vertically spaced parallel plates, a transparent vertical cylinder clamped between the plates, said plates being provided with openings axially aligned with the cylinder, a metal tube extending through said openings and cylinder, a flexible seal mounted on the top plate around its opening and supporting the tube to permit the lower end of the tube to be moved about beneath the bottom plate, the tube having an inert gas inlet at its upper end and a gas outlet at its lower end, means at the upper end of the tube for connecting it to a source of electric current, an electrode tip projecting from the lower end of the tube, a shield encircling the lower end of the tube spaced therefrom and supported at its upper end thereby, the portion of the tube inside the shield being provided with additional gas outlets in its side, a pedestal for supporting said bottom plate, the pedestal being provided with an opening beneath said bottom plate opening, and said tube extending down through said pedestal opening, and a trough for supporting workpieces being welded end to end, the bottom of the pedestal being provided with notches receiving the upper edges of the trough to support the pedestal and permit it to be moved along the trough.

References Cited in the file of this patent

UNITED STATES PATENTS

| | | |
|---|---|---|
| 1,746,207 | Alexander | Feb. 4, 1930 |
| 1,749,765 | Hendrickson | Mar. 11, 1930 |
| 1,869,015 | Lincoln | July 26, 1932 |
| 2,376,185 | Randall | May 15, 1945 |
| 2,439,874 | Suter | Apr. 20, 1948 |
| 2,459,812 | Griffiths | Jan. 25, 1949 |
| 2,555,017 | Tuthill | May 29, 1951 |
| 2,665,363 | Wepfer | Jan. 5, 1954 |
| 2,760,044 | Mott | Aug. 21, 1956 |
| 2,856,510 | Jones | Oct. 14, 1958 |